United States Patent [19]
Cone et al.

[11] 3,905,921

[45] Sept. 16, 1975

[54] RAPIDLY-FOAMABLE, FAST-SETTING PHENOLIC RESIN PLYWOOD GLUE

[75] Inventors: Charles N. Cone, Portland; Julius M. Steinberg, Hillsboro, both of Oreg.

[73] Assignee: Pacific Adhesives Company, Inc., Hillsboro, Oreg.

[22] Filed: Mar. 26, 1973

[21] Appl. No.: 345,208

[52] U.S. Cl............. 260/2.5 F; 260/2.5 F; 260/29.3; 156/78; 156/244; 428/314
[51] Int. Cl.²...................... C08J 9/30; C08L 61/06
[58] Field of Search.......... 260/2.5 F, 29.3; 161/161

[56] References Cited
UNITED STATES PATENTS

| | | | |
|---|---|---|---|
| 2,323,831 | 7/1943 | Menger et al. | 260/2.5 F |
| 2,389,183 | 11/1948 | Cone | 260/29.3 |

*Primary Examiner*—Morton Foelak
*Attorney, Agent, or Firm*—Eugene D. Farley

[57] ABSTRACT

A rapidly-foamable, fast setting phenolic resin liquid plywood glue for use particularly in a plywood production line including an in-line continuous foaming unit comprises an aqueous alkaline solution of a fast setting, highly advanced, phenol aldehyde resin and a dried animal blood foaming agent. Glyoxal or other aldehyde is included to control the viscosity of the glue. Upon agitation in air or other gas the resulting glue is uniformly foamable to a density of the order of 0.2 gm/cc in a time of the order of two seconds.

17 Claims, No Drawings

RAPIDLY-FOAMABLE, FAST-SETTING PHENOLIC RESIN PLYWOOD GLUE

This invention relates to liquid glues of the class used in the manufacture of plywood. It pertains particularly to liquid glues comprising phenolic resins and dried animal blood, which are rapidly foamable and fast setting and which accordingly in the manufacture of plywood are applicable to the in-line application of foamed glues to wood veneers.

The application of phenolic resin glues in foamed condition is well known and has been practiced commercially from time to time over a period of several years. Their application has been attended by many significant advantages, including more uniform coverage per unit weight of glue; satisfactory coverage of rough surfaces with less glue; minimum penetration into the substrate; faster drying; the use of lower viscosity glues; the elimination of the necessity of using solid extenders; and, in some instances, lower unit glue weight and therefore lower glue costs while still producing satisfactory bonding.

This application of the phenolic resin glues presupposes, of course, that they are foamable. In the past, it has been possible to foam such glues adequately since relatively low molecular weight phenolic resins were used in their manufacture. However, the use of phenolic resins of low molecular weight created an economic problem in that a relatively long press time was required to cure them in the plywood hot presses. This in turn delayed production and increased costs.

In an effort to overcome this problem, the plywood industry has turned to the use of more highly advanced resins which cure faster in the press. Such resins, being less soluble in alkaline solutions than are the less highly advanced resins, presently are supplied to the market in aqueous alkaline solutions containing about 40% by weight resin solids, as opposed to the solutions containing about 50% resin solids, formerly used extensively.

A serious problem attending the use of the present day more highly advanced phenolic resin glues is that using conventional foaming techniques, they are not foamable at all, or at least with sufficient speed to be useful in the commercial production of plywood using foamed glue. The problem is particularly acute when manufacturing plywood by the process set forth in the copending patent application of Charles N. Cone, Ser. No. 80,961, filed Oct. 15, 1970 for PLYWOOD MANUFACTURE USING FOAMED GLUES, now abandoned.

In accordance with the Cone procedure, phenolic resin glue is passed continuously from a reservoir to an in-line foamer where it is converted to foam. The resulting foam then is passed continuously to an applicator head which applies it to wood veneer surfaces in the plywood production line. Since the volume requirements of foam are high and the capacity of an in-line foamer necessarily is restricted, it is essential, for the successful application of this procedure, that the foaming of the liquid phenolic resin glue occur very rapidly, i.e. in a few seconds. Up to the present time this has not been possible, using the highly advanced phenolic resin glues of present day commerce.

A possible solution to the problem is the inclusion in the glue mix of a suitable foaming agent for phenolic resin glues. Menger et al, U.S. Pat. No. 2,323,831, for example, suggests a large number of foaming agents which may be used to assist in the foaming of phenolic resin glues.

Listed as foaming agents in this patent are such materials as casein, hide glue, bone glue, blood, blood albumen, saponins, the salts of diisopropyl naphthalene sulfonic acid, the salts of sulfonated tar oils or of sulfonated fatty acids, the ammonium salts of high molecular weight aliphatic carboxylic acids such as fatty acids, wax acids, rosin acids and montanic acid. This reference does not indicate, however, the applicability of these foaming agents to the foaming of highly advanced phenolic resin glues, nor could it, since such glues were not commercially available nor in use at the time the Menger et al. work was done.

Neither does the Menger et al. disclosure recognize that, of all the foaming agents listed, dried blood when added to a phenolic resin glue will convert it to a product which can be foamed successfully in a matter of a few seconds in an in-line plywood plant glue foaming unit to produce a uniform, stable foamed glue which can be applied to advantage in the commercial manufacture of plywood.

Applicants have discovered that this is the case. In accordance with the present invention rapidly foamable, fast setting phenolic resin plywood glue is made by forming an aqueous alkaline solution of a highly advanced resinous condensation product of a phenol and an aldehyde, particularly phenol and formaldehyde, having a resin solids content of from 30–45% by weight. The degree of advancement of the resin is such as to impart to the aqueous resin solution a viscosity of from 3–30 poises.

Mixed with this is a dried, powdered animal blood product used in amount sufficient to render the liquid glue convertible upon agitation in a gas and in less than 30 seconds, preferably less than 15 seconds, to a foam having a density of less than 0.5 and more preferably, in less than 15 seconds to a foam having a density of less than 0.3.

Water is included in the glue mix in amount sufficient to impart to the adhesive a viscosity of from 1–50 poises. From 0.1 to 10% by weight, based on the dry weight of the blood, of glyoxal or other aldehyde may be included in the blend to lower its viscosity to working levels.

The resulting glue mix upon introduction into an in-line continuous foamer may be foamed in a few seconds to a uniform foam having a density of less than 0.5, specifically about 0.2 grams/cc., and accordingly is well adapted to continuous application to traveling plywood veneers in a plywood mill production line.

The hereindescribed glue compositions when foamed are also characterized by the following important advantages:

They are substantially faster curing than those not including blood. This decreases press time and increases production. They have a substantially longer assembly time tolerance, correspondingly facilitating plant schedules. They require less heat for curing, thereby lowering required press temperatures and further decreasing press times.

They do not require the presence of a filler such as clay, walnut shell flour, oat hull floor, wood flour, ground bark, or ground corn cobs, which normally are used with conventional plywood glues with accompanying well known problems. Accordingly, it is possible to reduce the amount of water in the glue mix. This in turn reduces the likelihood of blistering in the press.

Considering the foregoing in greater detail:

As noted above, the hereindescribed phenolic resin plywood glues comprise essentially an aqueous alkaline solution of a highly advanced resinous condensation product of a phenol and an aldehyde; a quantity of dried animal blood foaming agent; water; and, optionally, an aldehyde type viscosity-lowering agent.

The resinous condensation product of a phenol and an aldehyde used in the glues of the invention may comprise any of those suitable for use in the production of plywood-type glues. Typical phenols employed in the manufacture of such products comprise phenol itself, the cresols, and resorcinol. Typical aldehydes employed in the manufacture of such products include formaldehyde, acetaldehyde, and furfural. The commonest of such products, and the one with reference to which the present invention is described, comprises the resinous condensation product of phenol and formaldehyde.

Whatever its identity, the phenolic resin adhesive employed in the present formulation is characterized by having a relatively high degree of advancement so that it will set rapidly in the plywood press, i.e. in a matter of five minutes or so under the usual press conditions, as compared with six or seven minutes for the formerly used phenolic resins having a lesser degree of advancement.

The degree of advancement of such resins is a difficult property to characterize. However, for the present purposes the phenolic resins are contemplated which have a resin solids content of from 30–45% by weight, but have a degree of advancement such as to impart to the aqueous resin solutions in which they are contained a viscosity of from 3–30 poises. When incorporated in a plywood glue the resulting glue is capable of producing plywood association "exterior grade" quality glue bonds when two 7/16 inch three ply panels are pressed per plywood press opening for a period of 6½ minutes with press plates at 300°F.

Such phenolic resins normally are supplied to the plywood trade in the form of their aqueous alkaline solutions having a sufficient content of caustic soda or other alkaline material to impart to them a pH of from 9–12.

The blood which is the second major component of the presently described plywood adhesives comprises the dried blood of commerce available in powdered form. This product is manufactured by collecting beef, hog or sheep blood from the slaughter house floor and dehydrating it under controlled conditions to a dry powder form.

In one successfully operated commercial process, the blood is sprayed into a cyclone separator containing hot air under carefully controlled conditions of temperature and time to produce a spray dried blood product of desired properties. By controlling the operating variables the degree of water solubility of the dry blood may be varied over a range of from completely soluble to completely insoluble in water.

Although it is possible to use any of the solubility grades of blood, from completely soluble to completely insoluble, it is preferred to use a blood product having a water solubility of from 30–90% by weight. Blood products having a solubility of less than 30% are not quite as efficient as foaming agents as are those having a greater degree of water solubility. On the other hand, blood products having a water solubility of more than 90% tend to cause gelation of the compositions.

Preferably, the dried animal blood is used in an amount of 5–30%, and more preferably 8–15%, by weight based on the weight of the resin solids content of the adhesive.

The third major component of the hereindescribed plywood glues is water. A certain content of water is introduced into the glue mix via the water content of the aqueous resin employed. Additional water may be added, however, in amount sufficient to produce a product viscosity of the desired value, broadly from 1–50 poises, preferably from 1–30 poises.

Under some conditions, combining blood with highly advanced phenolic resin glue solutions creates a problem in that the resulting mixture has a higher viscosity than either of its components. Furthermore, this viscosity tends to increase rapidly with time to levels interfering with normal plant procedures.

The degree of viscosity increase may be controlled to some extent by minimizing the amount of added blood, maximizing the amount of added water, using blood of a lower degree of water solubility, and using a less highly advanced resin.

For practical purpose, it often is not possible to control these variables sufficiently to produce the desired result. In such cases, advantage may be taken of our discovery that the viscosity of the phenolic resin plywood glues of the class described herein may be controlled rapidly and effectively by the inclusion in the compositions of a viscosity-controlling amount of an aliphatic or aromatic aldehyde.

Typical of materials of this class which may be employed are the lower aliphatic aldehydes including formaldehyde; the formaldehyde donors, such as paraformaldehyde, sodium sulfite formaldehyde, and oxyzolidine; glyoxal; glutaraldehyde; pyruvicaldehyde; and the lower molecular weight aromatic aldehydes such as benzaldehyde. These aldehydes may be used singly or in combination with each other. They are used in amount sufficient to reduce the viscosity of the glue to the desired level. Normally this will require from 0.1 to 10% by weight of aldehyde, based on the weight of the solid blood content of the composition.

The viscosity reducing effect of the aldehyde is surprising in view of the fact that normally aldehydes added to alkaline solutions of blood markedly increase, rather than decrease, the viscosities of the solutions. Furthermore, the addition of the aldehydes to the presently described compositions does not impair either the foam inducing or the adhesion enhancing properties of the blood.

The glues of the invention are easily and simply prepared, usually in two stages.

In the first stage, the predetermined amount of water and solid dried blood are thoroughly mixed in a suitable mixer. From one to three minutes of mixing suffices. Next the selected phenolic resin is added to the mixture and the mixing continued for another period of from one to three minutes. The mixing may be carried out at room temperature and no special precautions such as cooling of the mix are required.

In the event that an aldehyde anti-thickener is to be included, the foregoing procedure is modified by adding the selected aldehyde in the predetermined amount to the mixer in the first stage of mixing. To be effective, the aldehyde should be added to the blood-water mixture before the blood is mixed with the resin.

The compositions prepared as above are ready for use in the manufacture of plywood. Although they may be foamed batchwise before application to the veneers, they are particularly suited for continuous in-line foaming at a high production rate using the procedure outlined in the aforesaid U.S. patent application of Charles N. Cone, Ser. No. 80,961. Their use is attended by the above noted advantages of rapid and uniform foaming, even when highly advanced resins are used; long assembly time tolerance; elimination of the need for filler use with attendant disadvantages; faster curing in the press; and less heat required for curing.

The process of the invention is illustrated by the following examples wherein parts are given in parts by weight and percentages are given in percentages by weight.

EXAMPLE 1

This example compares the application of the herein-described rapidly foamable, fast setting phenolic resin glue containing a highly advanced phenolic resin, in both foamed and unfoamed condition, with a commercial phenolic resin glue containing phenolic resin having a conventional degree of advancement, in the manufacture of plywood.

The adhesive composition of the invention was prepared as follows:

240 Parts water and 50 parts blood having a water solubility at 72°F. of 50% by weight were mixed in a mechanical mixer for two minutes. 1,000 Parts of aqueous alkaline phenol formaldehyde resin ("Borden W-166S") having a viscosity of 5 poises, a pH of about 11 and a resin solids content of 40% by weight were added and the mixing continued for 2 minutes. The composition then was ready for application.

The conventional phenolic resin adhesive composition was prepared as follows:

220 Parts water at 70°, 100 parts alder bark filler, and 34 parts wheat flour filler were mixed for five minutes. 75 Parts of aqueous alkaline highly advanced phenol formaldehyde liquid resin ("Borden W-166S") having a viscosity of 5 poises, a pH of about 11 and a solids content of about 40% were added and the mixing continued for two minutes.

30 Parts 50% aqueous caustic soda then was added and the mixing continued for another two minutes. 15 Parts soda ash was added and the mixing continued for another 20 minutes. 540 Parts of the same phenol formaldehyde resin was added and the mixing continued for 5 minutes. This gave the finished conventional adhesive composition.

The two adhesive compositions prepared in the foregoing manner then were applied to the manufacture of plywood.

In one test procedure a portion of the adhesive composition of the invention which contained blood as a foaming agent was introduced into the in-line continuous foamer described above and thereby converted in a foaming time of about three seconds to a uniform foam having a density of 0.2 grams per c.c. This was extruded onto the surfaces of wood veneers which then were laid up into plywood assemblies.

For purposes of comparison, another portion of the blood-resin glue of the invention was roller spread on wood veneers which then were laid up into plywood making assemblies in the usual manner.

The conventional phenol-formaldehyde resin glue could not be foamed in the in-line foaming unit in the dwell time of the unit. It was roller spread on plywood veneers which then were laid up into plywood assemblies in the usual manner.

In all three cases the assemblies comprised three ply Douglas fir panels of 7/16 inch thickness pressed two per press opening in a hot press with plates at 300°F. for 5¼ minutes. Test pieces were cut from the resulting panels and subjected to the standard Plywood Association shear test. In each case groups of panels having assembly times of 4, 14 and 32 minutes were tested. This spans the range of assembly times ordinarily used in the plywood mill. The test results were averaged.

The glue spread rate for the blood-resin glues of the invention was 26 pounds per thousand square feet of single glue line; that for the conventional phenolic resin glue, 34 pounds. The pounds of resin applied per thousand square feet thus was approximately the same in both cases.

The results of the test are given in Table I.

TABLE I

PLYWOOD SHEAR TEST RESULTS — (AVERAGE)

| Glue | Procedure | Load in Lbs. Per Sq. In. | % Wood Failure |
|---|---|---|---|
| Blood Resin | Foamed and Extruded | 246 | 97 |
| Blood Resin | Not Foamed, Roller Spread | 202 | 65 |
| Conventional Phenolic Resin Glue | Not Foamed, Roller Spread | 34 | 02 |

The foregoing results clearly indicate several things. First, the hereindescribed blood resin glue is rapidly foamable under conditions in which the conventional phenolic resin glue is not foamable at all, although both glues contain the same phenolic resin of high degree of advancement. Second, the hereindescribed blood resin glues can be cured adequately in the press at a press time of only 5¼ minutes. The usual press time required for the conventional phenolic resin glue described above is 6¼ minutes or longer. This represents a saving in press time of almost 20%. Third, the blood-resin composition of the invention foamed has a noticeably faster cure than does the same blood-resin mixture unfoamed. This is unexpected and additionally indicates the unique quality of the composition.

In a manner similar to the foregoing there are prepared and applied the glues of the invention using, in place of the phenol-formaldehyde resin: a cresol formaldehyde resin, a resorcinol formaldehyde resin, a phenol acetaldehyde resin, or a phenol furfural resin.

EXAMPLE II

This example illustrates the unique suitability of dried animal blood as a rapid foaming agent for foaming phenolic resin solutions containing phenolic resins of a high degree of advancement.

In the preparation of the test compositions, "x" parts of the test agent was mixed with 300 parts of water for two minutes. The resulting mixture then was added to 1,000 parts of aqueous alkaline phenol-formaldehyde resin having a solids content of 40% by weight, a viscosity of about 5 poises and a pH of about 11 and mixed for another two minutes.

The resulting composition then was passed continuously through an in-line foamer where it was mixed with a stream of air. In order to foam the mixture exhaustively, the streams were recirculated until the liquid would take up no more air. This required a time of up to 3 minutes.

The stream when it emerged from the foamer contained large bubbles of incorporated air. These bubbles were separated from the stream and a measured volume of the foamed material, free of large bubbles, was weighed to determine its density (grams per cubic centimeter).

The results are given in Table II.

TABLE II

| Test No. | FOAMING AGENT Kind | Amount (Parts by weight) | Foamed Density (g/cc.) |
|---|---|---|---|
| 1 | Blood-30% water soluble | 50 | .198 |
| 2 | " | 30 | .320 |
| 3 | Blood-40% water soluble | 30 | .221 |
| 4 | Blood-50% water soluble | 50 | .121 |
| 5 | " | 40 | .172 |
| 6 | " | 30 | .251 |
| 7 | " | 20 | .427 |
| 8 | Blood-70% water soluble | 30 | .290 |
| 9 | Blood-90% water soluble | 30 | .301 |
| 10 | Blood-water insoluble | 30 | .484 |
| 11 | Soybean flour | 100 | .834 |
| 12 | Animal glue | 50 | .990 |
| 13 | Alkyl aryl sulfonate type foaming agent ("Ultra Wet 60L") | 30 | .712 |
| 14 | " | 60 | .594 |
| 15 | Sodium salt of an alkyl aryl sulfonate type wetting agent ("Ultra Wet SK") | 30 | .780 |
| 16 | Oleic acid ("Neofat 9404") | 30 | .846 |
| 17 | Stearic acid ("Neofat 854") | 30 | 1.03 |
| 18 | Aliphatic amine type wetting agent ("Armeen DMHT") | 30 | 1.08 |
| 19 | Amine type wetting agent ("Armflow 65") | 30 | 1.05 |
| 20 | Sodium alkyl aryl polyether sulfate type wetting agent ("Triton 770") | 30 | .984 |
| 21 | " ("Triton X200") | 30 | .985 |
| 22 | Palmolive soap | 30 | .876 |

The test results set forth in Table II clearly indicate the unique suitability of dried animal blood as a foaming agent for highly advanced aqueous alkaline phenol formaldehyde resins. Even when exhaustively foamed over a period of several minutes, the listed non-blood foaming agents, which all are of recognized potency, did not produce a foam having the density of 0.5 or less necessary for successful application in the in-line application for foamed glue to plywood production.

The test results further indicate that animal bloods of all grades of water solubility, i.e. per cent soluble in water at 72°F. in 5 minutes, share this unique property. Thus even blood which has been heated until it is totally insoluble is a reasonably efficient foaming agent for the intended purpose. Bloods having solubility in the range of 30 to 90% by weight are preferred.

EXAMPLE III

This example illustrates the effectiveness of a minor proportion of an aldehyde in lowering the viscosity of the hereindescribed blood-resin adhesive compositions:

The procedure of Example I was followed with the exception that the indicated amount of the indicated aldehyde was added to the water-dry blood mixture preliminary to mixing in the phenoic resin. The blood employed was dried animal blood having a water solubility of 40–50% by weight. The resin employed was an aqueous alkaline solution having a pH of from 9–11, a viscosity of 5 poises, and a solids content of highly advanced phenol formaldehyde resin of 40%.

TABLE III

| Aldehyde Additive | Amount (Parts by weight) | 3½ hr Viscosity (poises) | 22 hr Viscosity (poises) |
|---|---|---|---|
| None - (Control) | — | 45.6 | 260 |
| 40% Aqueous Glyoxal | 1 | 9.2 | 16.3 |
| 40% Aqueous Glyoxal | 3 | 5 | 7.3 |
| 37% Aqueous Formaldehyde | 1 | 9 | 14 |
| 37% Aqueous Formaldehyde | 3 | 4 | 4.3 |
| 25% Aqueous Glutaraldehyde | 3 | 9 | 14 |
| 45% Aqueous Pyruvic Aldehyde | 3 | 10.1 | 15.8 |
| 100% Benzaldehyde | 3 | 14.8 | 27.7 |
| Sodium Sulfite Formaldehyde | 6 | 11.2 | 16 |
| 60% Aqueous Oxyzolidine | 3 | 9.7 | 12.0 |

Thus the addition of even a small amount of a wide variety of aldehydes effectively controls the viscosity of the glues.

Having thus described out invention in preferred embodiments, we claim:

1. A rapidly foamable, fast setting phenolic resin liquid plywood glue comprising:
   a. an aqueous alkaline solution of a resinous condensation product of a phenol and an aldehyde having a resin solids content of from 30–45% by weight, the resinous condensation product having a degree of advancement such as to impart to the aqueous resin solution a viscosity of from 3–30 poises,
   b. dried animal blood having a water solubility not exceeding 90% by weight used in amount sufficient to render the liquid glue convertible upon agitation in a gas and in less than 30 seconds, to a foam having a density of less than 0.5 grams/cc,
   c. from 0.1 to 10% by weight, based on the dried weight of the blood, of an aldehyde glue viscosity lowering agent, and
   d. water used in amount sufficient to impart to the liquid glue a viscosity of from 1-50 poises.

2. The glue of claim 1 wherein the resinous condensation product comprises a resinous condensation product of phenol and formaldehyde.

3. The glue of claim 2 wherein the dried animal blood comprises spray dried beef blood.

4. The glue of claim 2 wherein the dried animal blood has a water solubility of from 30–90% by weight.

5. The glue of claim 2 wherein the blood is used in amount sufficient to render the liquid adhesive convertible to a foam having a density of less than 0.3 upon agitation in a gas in less than 15 seconds.

6. The glue of claim 2 wherein water is used in amount sufficient to impart to the liquid adhesive a viscosity of from 1–30 poises.

7. The glue of claim 1 having a pH of from 9–12.

8. The glue of claim 2 wherein the dried animal blood is used in an amount of 5–30% by weight, based on the weight of the resin solids content of the adhesive.

9. The glue of claim 2 wherein the dried animal blood is used in an amount of 8–15% by weight, based on the weight of the resin solids content of the adhesive.

10. The glue of claim 1 wherein the viscosity lowering agent comprises at least one member of the group consisting of formaldehyde, paraformaldehyde, sodium sulfite formaldehyde, oxyzolidine acetaldehyde, glyoxal, glutaraldehyde, pyruvicaldehyde and benzaldehyde.

11. The glue of claim 10 wherein the viscosity lowering agent comprises formaldehyde.

12. The glue of claim 10 wherein the viscosity lowering agent comprises acetaldehyde.

13. The glue of claim 10 wherein the viscosity lowering agent comprises glyoxal.

14. The glue of claim 10 wherein the viscosity lowering agent comprises glutaraldehyde.

15. The glue of claim 10 wherein the viscosity lowering agent comprises pyruvicaldehyde.

16. The glue of claim 2 wherein the blood comprises dried beef blood.

17. The glue of claim 2 wherein the blood has a water solubility of from 30–90% by weight, the blood is used in amount sufficient to render the liquid glue convertible to a foam having a density of less than 0.5 by agitation in a gas for less than 15 seconds, and the water is used in amount sufficient to impart to the liquid glue a viscosity of from 1–30 poises.

* * * * *